US008631451B2

(12) United States Patent
Bennett et al.

(10) Patent No.: US 8,631,451 B2
(45) Date of Patent: Jan. 14, 2014

(54) SERVER ARCHITECTURE SUPPORTING ADAPTIVE DELIVERY TO A VARIETY OF MEDIA PLAYERS

(75) Inventors: James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1725 days.

(21) Appl. No.: 11/247,739

(22) Filed: Oct. 11, 2005

(65) Prior Publication Data

US 2006/0026302 A1    Feb. 2, 2006

Related U.S. Application Data

(63) Continuation-in-part of application No. 10/675,377, filed on Sep. 30, 2003, now Pat. No. 8,028,093, and a continuation-in-part of application No. 10/675,903, filed on Sep. 30, 2003, now Pat. No. 8,059,537, and a continuation-in-part of application No. 10/675,110, filed on Sep. 30, 2003, now Pat. No. 7,296,295.

(60) Provisional application No. 60/467,990, filed on May 5, 2003, provisional application No. 60/443,897, filed on Jan. 30, 2003, provisional application No. 60/444,099, filed on Jan. 30, 2003, provisional application No. 60/443,996, filed on Jan. 30, 2003, provisional application No. 60/444,243, filed on Jan. 30, 2003, provisional application No. 60/464,711, filed on Apr. 23, 2003, provisional application No. 60/457,179, filed on Mar. 25, 2003, provisional application No. 60/467,867, filed on May 5, 2003, provisional application No. 60/432,472, filed on Dec. 11, 2002, provisional application No. 60/443,894, filed on Jan. 30, 2003, provisional application No. 60/478,528, filed on Jun. 13, 2003, provisional application No. 60/470,960, filed on May 15, 2003.

(51) Int. Cl.
*H04N 7/173* (2011.01)
*G06F 13/00* (2006.01)

(52) U.S. Cl.
USPC ............... 725/105; 725/101; 725/54; 725/95

(58) Field of Classification Search
USPC .................... 725/93, 116, 146, 71, 95–96
See application file for complete search history.

(56) References Cited

U.S. PATENT DOCUMENTS 5,631,693 A * 5/1997 Wunderlich et al. ............ 725/91
5,673,358 A * 9/1997 Boyce ........................... 386/112

(Continued)

FOREIGN PATENT DOCUMENTS

| EP | 1494375 A2 | 5/2005 |
|---|---|---|
| WO | 0079801 A1 | 12/2000 |
| WO | 03043326 A1 | 5/2003 |

OTHER PUBLICATIONS

European Patent Office; European Search Report; EP Application No. 06015803.7; Feb. 5, 2013; 9 pgs.

*Primary Examiner* — Brian Pendleton
*Assistant Examiner* — Jean D Saint Cyr
(74) *Attorney, Agent, or Firm* — Garlick & Markison; Randy W. Lacasse

(57) ABSTRACT

A media server component serves media programs to a plurality of client media players across a distribution network taking into consideration available data transfer rate and media player characteristics. The media programs are served adaptively, considering screen size, refresh rate required, frame rate, audio format, user preferences at the recipient media player's end and estimated available data transfer rate. The media server component responds to the channel conditions, recipient media audio and video characteristics and the user preferences at the recipient device's end in real time, by either delivering a stored program or transcoding the stored program in real time.

26 Claims, 9 Drawing Sheets

(56) References Cited

U.S. PATENT DOCUMENTS

| | | | |
|---|---|---|---|
| 5,841,439 A * | 11/1998 | Pose et al. | 345/418 |
| 5,883,613 A * | 3/1999 | Iwaki | 345/681 |
| 6,407,680 B1 | 6/2002 | Lai | |
| 6,434,197 B1 * | 8/2002 | Wang et al. | 375/240.29 |
| 6,463,445 B1 * | 10/2002 | Suzuki et al. | 1/1 |
| 6,665,454 B1 * | 12/2003 | Silverbrook et al. | 382/299 |
| 7,076,524 B2 * | 7/2006 | Takeo et al. | 709/203 |
| 7,543,326 B2 * | 6/2009 | Moni | 725/95 |
| 2002/0007313 A1 * | 1/2002 | Mai et al. | 705/14 |
| 2002/0059623 A1 | 5/2002 | Rodriguez et al. | |
| 2002/0088002 A1 | 7/2002 | Shintani et al. | |
| 2002/0100052 A1 * | 7/2002 | Daniels | 725/87 |
| 2003/0075983 A1 * | 4/2003 | Stecyk et al. | 307/38 |
| 2003/0117382 A1 * | 6/2003 | Pawlowski et al. | 345/204 |
| 2004/0010464 A1 * | 1/2004 | Boaz | 705/40 |
| 2007/0067245 A1 * | 3/2007 | Yassa | 705/59 |
| 2007/0277201 A1 * | 11/2007 | Wong et al. | 725/40 |
| 2012/0096490 A1 * | 4/2012 | Barnes, Jr. | 725/34 |

* cited by examiner

SERVER ARCHITECTURE SUPPORTING ADAPTIVE DELIVERY TO A VARIETY OF MEDIA PLAYERS

CROSS REFERENCES TO PRIORITY APPLICATIONS

1. This application is a continuation in part of U.S. Utility patent application Ser. No. 10/675,377, filed Sep. 30, 2003, now U.S. Pat. No. 8,028,093, which claims priority to and claims the benefit of: U.S. Provisional Patent Application Ser. No. 60/467,990, filed May 5, 2003; U.S. Provisional Patent Application Ser. No. 60/443,897, filed Jan. 30, 2003; U.S. Provisional Patent Application Ser. No. 60/444,099, filed Jan. 30, 2003; U.S. Provisional Patent Application Ser. No. 60/443,996, filed Jan. 30, 2003; U.S. Provisional Patent Application Ser. No. 60/444,243, filed Jan. 30, 2003; U.S. Provisional Patent Application Ser. No. 60/464,711, filed Apr. 23, 2003; U.S. Provisional Patent Application Ser. No. 60/457,179, filed Mar. 25, 2003; U.S. Provisional Patent Application Ser. No. 60/467,867, filed May 5, 2003; U.S. Provisional Patent Application Ser. No. 60/432,472, filed Dec. 11, 2002; and U.S. Provisional Patent Application Ser. No. 60/443,894, filed Jan. 30, 2003, all of which are incorporated herein by reference for all purposes.

2. This application is a continuation in part of U.S. Utility patent application Ser. No. 10/675,903, filed Sep. 30, 2003, now U.S. Pat. No. 8,059,537, which claims priority to and claims the benefit of: U.S. Provisional Patent Application Ser. No. 60/478,528 filed Jun. 13, 2003; U.S. Provisional Patent Application Ser. No. 60/444,243, filed Jan. 30, 2003; U.S. Provisional Patent Application Ser. No. 60/443,897, filed Jan. 30, 2003; U.S. Provisional Patent Application Ser. No. 60/444,099, filed Jan. 30, 2003; U.S. Provisional Patent Application Ser. No. 60/443,996, filed Jan. 30, 2003; U.S. Provisional Patent Application Ser. No. 60/444,243, filed Jan. 30, 2003; U.S. Provisional Patent Application Ser. No. 60/464,711, filed Apr. 23, 2003; U.S. Provisional Patent Application Ser. No. 60/457,179, filed Mar. 25, 2003; U.S. Provisional Patent Application Ser. No. 60/467,867, filed May 5, 2003; U.S. Provisional Patent Application Ser. No. 60/432,472, filed Dec. 11, 2002; and U.S. Provisional Patent Application Ser. No. 60/443,894, filed Jan. 30, 2003; all of which are incorporated herein by reference for all purposes.

3. This application is a continuation in part of U.S. Utility patent application Ser. No. 10/675,110, filed Sep. 30, 2003, now U.S. Pat. No. 7,296,295, which claims priority to and claims the benefit of: U.S. Provisional Patent Application Ser. No. 60/444,243, filed Jan. 30, 2003; U.S. Provisional Patent Application Ser. No. 60/443,897, filed Jan. 30, 2003; U.S. Provisional Patent Application Ser. No. 60/444,099, filed Jan. 30, 2003; U.S. Provisional Patent Application Ser. No. 60/443,996, filed Jan. 30, 2003; U.S. Provisional Patent Application Ser. No. 60/467,990, filed May 5, 2003; U.S. Provisional Patent Application Ser. No. 60/464,711, filed Apr. 23, 2003; U.S. Provisional Patent Application Ser. No. 60/457,179, filed Mar. 25, 2003; U.S. Provisional Patent Application Ser. No. 60/467,867, filed May 5, 2003; U.S. Provisional Patent Application Ser. No. 60/432,472, filed Dec. 11, 2002; and U.S. Provisional Patent Application Ser. No. 60/470,960, filed May 15, 2003; and U.S. Provisional Patent Application Ser. No. 60/443,894, filed Jan. 30, 2003; all of which are incorporated herein by reference for all purposes.

FEDERALLY SPONSORED RESEARCH OR DEVELOPMENT

Not Applicable

MICROFICHE/COPYRIGHT REFERENCE

Not Applicable

BACKGROUND OF THE INVENTION

1. Field of the Invention

This invention generally relates to video systems, and, more particularly, to media distribution and consumption within home and mobile entertainment environments.

2. Related Art

In wide spread use, media players each include one or both of a video display and corresponding sound system. Media players take the form of portable and stationary devices such as analog and digital televisions, computers, pocket televisions, cell phones, PDAs (Personal Digital Assistants), projectors, portable audio players, portable game units and digital watches, for example.

Such media players use a wide variety of industry standard video and audio formats such as NTSC (National Television Systems Committee), PAL (Phase Alternation Line), VGA (Video Graphics Array), QVGA (Quadrature Video Graphics Array) and HDTV (High Definition TeleVision). Other media players employ unique, proprietary audio and/or video format requirements. For example, to provide a particular service, some media players might require a proprietary screen resolution, refresh, frame rate and video/audio encoding and compression techniques that are only supported by a single or several manufacturers.

Various systems, hereinafter "media sources", provide the media to the media players for presentation to a viewer/listener. Media sources include cable, fiber, and satellite Set-Top-Boxes (STBs), Digital Video Disk (DVD) players, Personal Video Recorders (PVRs), computers, game consoles, wireless radio and television broadcasters, Internet servers, etc. The media sources provide a wide variety of media programming, both live and pre-recorded, that may be presented to a user via the media players.

There are many variables in delivery of a media program from a media source to a media player such as channel conditions (available data transfer rate, for example), recipient media audio and video characteristics, and the user preferences at the recipient device's end. The media programs thus served consume same amount of data transfer rate irrespective of the variations in the above-mentioned variables.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Features and advantages of the present invention will become apparent from the following detailed description of the invention made with reference to the accompanying drawings.

DETAILED DESCRIPTION OF THE INVENTION

Figure 1:
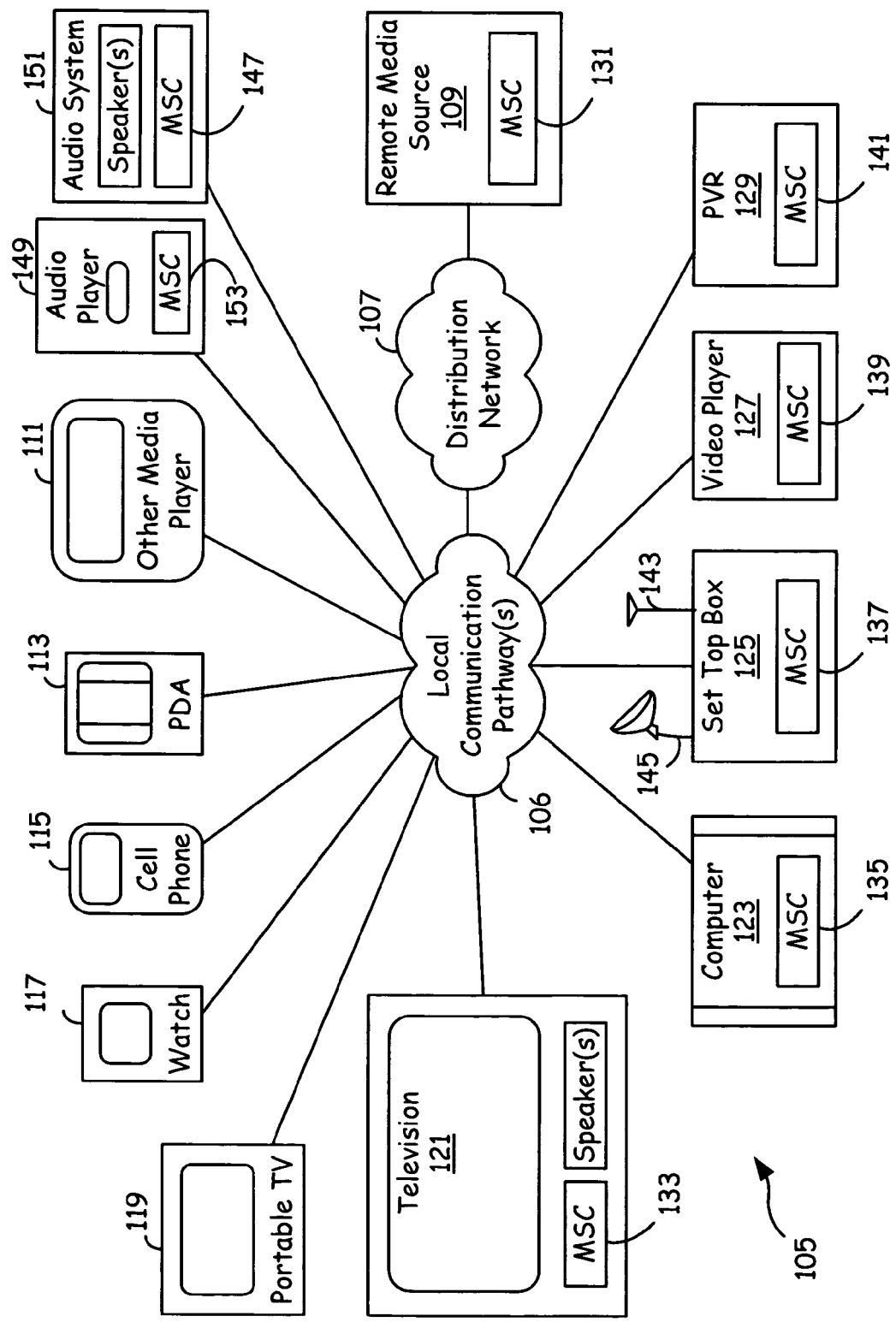
FIG. 1 illustrates a media distribution and consumption infrastructure in which a plurality of components of a media server component are built into various types of media source equipment in accordance with the present invention.

FIG. 1 illustrates a media distribution and consumption infrastructure in which a plurality of components of a media server component are built into various types of media source equipment in accordance with the present invention. The plurality of media players with audio and/or video functionalities include a personal digital assistant (PDA) 113, cell phone 115, wrist watch 117, portable television (TV) 119, television (TV) 121, computer 123, video player 127, audio player 149, audio system 151, personal video recorder—PVR (or personal digital recorder) 129 and other media player 111. The audio and video sources, that locally source media programs, include a set top box 125, video player 127, audio player 149, and personal video recorder 129. Because they source media programs and present or play back sourced media programs, the audio system 151, television 121 and personal computer 123 fall in both categories. The other media player 111 are those media players, which do not fall under any of the above mentioned categories and may include a digital video projector, personal video device, portable game unit and industry standard or proprietary media players with audio and/or video functionalities.

In a media distribution and consumption infrastructure 105, a remote media source 109 delivers media programs to a plurality of media players. The remote media source 109 represents many types of media program sources, such as one or more of Internet based servers, cable, fiber and satellite service providers, wireless radio, television broadcasters and industry standard or proprietary networks or links. The remote media source 109 delivers plurality of media programs adaptively to a plurality of media players with audio and/or video functionalities. The adaptation occurs automatically based upon communication characteristics, media player parameters, media player identifier and/or the user preferences, thereby efficiently utilizing available data transfer rate. To support adaptive delivery of plurality of media programs, the remote media source 109 is configured with a media server component 131, according to the present invention. In addition to the media server component 131 incorporated into the remote media source 109, the media server components 133, 135, 137, 139, 141, 147 and 153 may also be incorporated into the local audio and/or video sources 121, 123, 125, 127, 129, 151 and 149, respectively. The media server components 133, 135, 137, 139, 141, 147 and 153 allow adaptive delivery of media programs to the media players such as 111, 113, 115, 117, 119, 121, 123, and 151.

Each media server component 131, 133, 135, 137, 139, 141, 147 or 153 delivers media program stream adaptively such that the media server components incorporated into systems of a media distribution and consumption infrastructure 105, optimally utilizing the communication bandwidth. Optimal utilization of bandwidth requires minimal use of available data bit rate in a digital media distribution and consumption infrastructure 105, for example. The media server component 131, 133, 135, 137, 139, 141, 147, or 153 optimally utilizes bandwidth based upon the client media profile and communication characteristics. Examples of client media profile include screen resolution, frame rate in case of video systems and stereo or surround sound characteristics in case of audio systems. Each media server component 131, 133, 135, 137, 139, 141, 147 or 153 adapts to the communication characteristics and media player parameters based upon starting communication characteristics and media player parameters by media server component 131, 133, 135, 137, 139, 141, 147 or 153: (a) initially adapting screen resolution and frame rate to deliver a best guess video stream bandwidth; (b) adapting viewing window size and/or screen resolution to accommodate changes in connectivity and to support unexpected throughput variation in real time; and (c) invoking or resizing area of interest processing. In case of audio, in the above mentioned adaptive process, the "adapting" means supporting one of mono, stereo or surround sound systems based upon client media profile. Alternatively, the user preferences via user interaction in the client media players may also play a role in adaptive delivery of the media programs.

Each of the media server components 131, 133, 135, 137, 139, 141, 147 and 153 adaptively delivers media programs from one of plurality of video and audio formats stored in memory unit if readily available. If not readily available, the media server component processes one of the available stored media programs in real time to meet the adaptive requirements and delivers it. Typically, each media server component 131, 133, 135, 137, 139, 141, 147, or 153 will have access to a media program in multiple first formats, which are served whenever requested by any of plurality of media players 111, 113, 115, 117, 119, 121, 123, and 151. The conditions that determine media server component 131, 133, 135, 137, 139, 141, 147, or 153 serving the first available format include communication characteristics, media player parameters, user media player preferences and cost/rental of a pay-per-view media program. Otherwise, the media server component 131, 133, 135, 137, 139, 141, 147 or 153 uses one of the multiple first formats to creates and serves at least one other version of the video program in a second format. This creation process typically takes place in real time, but may also occur in the background. Each media server component 131, 133, 135, 137, 139, 141, 147, or 153 delivers the plurality of formats of the video program to the plurality of video systems for display. Thus, each of the media server components 131, 133, 135, 137, 139, 141, 147 and 153 optimally utilizes the available data transfer rate by observing the currently existing conditions.

The media server component 131, 133, 135, 137, 139, 141, 147 or 153 estimate the currently available data transfer rate based upon: (a). actual delivery conditions experienced when trying to deliver in one format; (b) test signals in advance of delivery; (c) signals received from the recipient or tracked by the sender, e.g., packet failures; (d) buffer conditions on the recipient system. This estimated rate is one of the determining factors in adaptive delivery of media programs. The media player A/V characteristics, another of the determining factors in adaptive delivery, include screen size and refresh rates of the media players. Further, the user preferences is one more determining factor in adaptive delivery, and includes user preferences at the recipient media player's end such as region of interest adaptation, resizing of the windows, or the quality of media program display. All of the above said factors are handled in real time by the media server components 131, 133, 135, 137, 139, 141, 147 or 153 to determine: a) the format of the audio and video programs to be served; b) whether the audio and video format to be served is readily available in the memory; and c) whether there is a need to process one of the readily available audio and video program format to suit the needs of the recipient media player.

Further, in any media distribution and consumption infrastructure that incorporates media server components 131, 133, 135, 137, 139, 141, 147 and/or 153, the adaptation may occur either periodically or discreetly. During television broadcast or wireless radio broadcast, for example, at every period of interval the conditions existing such as actual delivery conditions experienced and test signals in advance of delivery. However, the viewer may notice changes occasionally. Therefore, the transition from one format to another occurs in stages. That is, through several format changes to get to the end format, instead of taking one direct step. Softening is performed by modifying the content of the media data just before and/or just after the actual transition to smooth the transition event.

Other systems may perform the transition discreetly by synchronizing with a media player such as an I-Frame (MPEG) delivery or low/no volume instance in audio. For example, when the user resizes the screen in a media player to a smaller screen size, the media server component 131, 133, 135, 137, 139, or 141 may change the video format, retaining the same resolution. Similarly, during the time interval, such as advertising in which the audio signal is of mono quality, the media server component 131, 133, 135, 137, 139, 141, 147, or 153 may communicate a single audio channel. This kind of adaptation occurs discreetly, by synchronizing with each of the media players, based upon the conditions existing at the media player's end. The user may not notice any difference at the media player's end.

The media server components 133, 135, 137, 139, 141, 147 and 153 not only adaptively serve stored and/or processed media programs but also adaptively deliver other media programs in required pluralities of formats to the media players with audio and/or video functionalities 111, 113, 115, 117, 119, 121, 123, 125, 127, 129, 149 and 151. For example, the PDA 113 and television 121 might both interact with the STB 125 to select a first, single format broadcast television channel received from the remote media source 109 via a satellite dish 145, roof top antenna 143, cable infrastructure, fiber optic and twisted-pair telephony infrastructures. Twisted-pair telephony infrastructure may utilize ISDN, DSL, or other industry standard or proprietary protocol.

At the same time, the portable TV 119 might request a second television channel via the same pathway. In response, the media server component 137 simultaneously: a) adaptively delivers the first television channel video in its original format to the television 121; b) creates and adaptively delivers the video from the first television channel in a second format tailored for the PDA 113; and c) creates and adaptively delivers the video from the second television channel in a third format for the portable TV 119.

In another exemplary mode of operation, instead of using its own media server component 141, the PVR 129 may use the media server component of any other video source. For example, the PVR 129 delivers stored video to the STB 125. Upon receipt, the STB 125 employs the media server component 137 to produce the several formats required or requested by those of the plurality of video systems that desire to view such video. Of course, the PVR 129 might also be incorporated within the STB 125 and share a single media server component. Similarly, the television 121, video player 127, and personal computer 123 might also employ the media server component of the STB 125 whenever desired or if such video sources do not have a media server component installed. More generally, although their own media server component may be used, any video source may use the media server component of any other video source as selected or configured by the user or as necessary when a video source has no media server component. In summary, in a regionally interconnected set of media players, one media server component unit such as 137 of the STB 125 may serve adaptively and wirelessly to all of the recipient media players 111, 113, 115, 117, 119, 121, 123, 127, 129, 149, and 151 from plurality of sources 109, 121, 123, 125, 127, 129, 149 and 153.

The media server component 131 of the remote media source 109 serves adaptively plurality of media programs via a communication pathway 107, which may include a cable, satellite, cellular, fibre, twisted-pair or Internet infrastructure, to deliver programs plurality of media players. The STB 125 communicates with the remote media source 109 via a dish antenna 145, a cable (not shown) or a rooftop antenna 143. For example, a cable service provider may utilize a coaxial cable network as a distribution network 107 for adaptively delivering media programs and/or television broadcasts to a plurality of media devices such as 111, 113, 115, 117, 119, 121, 123, 125, 127, 129, 149, and 151. Similarly, to support fiber, satellite or roof top antenna television broadcasts, the distribution network 107 comprise a fiber and wireless infrastructure. The distribution network 107 also comprises wired and wireless, short and long-range links and networks, as well as any combinations thereof between any two of the illustrated elements.

In an embodiment, the media server component 131, 133, 135, 137, 139, 141, 147 or 153 delivers media based on communication characteristics and media player parameters. The media server component 131, 133, 135, 137, 139, 141, 147, or 153 directly receives a media player identifier from some of the media players. Others rely on user interaction to indirectly deliver the identifier, via Internet for example. Similarly, the media server component directly receives media player parameters from the media players such as 111, 121, 123, 127, 129, 149, or 151. For other of the media players 111, 121, 123, 127, 129, 149 or 151 the user may indirectly interact to provide such parameters; else, the media server component must extract the parameters from a remote or local database using the media player identifier. The media server component may receive starting communication characteristics from default setting, through sending test signals, or through interaction with the user. The media server component refines and adds to the communication characteristics immediately before or during the course of media delivery. Based on the starting communication characteristics and media player parameters, the media server begins delivery. During delivery, if the characteristics and/or parameters change, the media server component will intelligently adapt to attempt to best service the viewing and listening experience. This intelligent adaptation includes one or more of attempting to minimize noticeable frame dropping or stuttering, tearing or resolution changes, volume/brightness/contrast spikes, audio noise and dead zones.

If one of the media players being served by the Internet based service provider is a television 121, the media server component 131 may have to serve media programs in a HDTV format with Dolby 5.1 surround sound format. This requires a higher data transfer rate, than, for example, a news commentary that a user chooses to view with lesser video quality in a smaller window (which may benefit the viewer in terms of cost/transfer bit rate charged). The media server component 131 decides upon interaction with the television 121 that a VGA (Video Graphics Array) format with stereo quality audio may be delivered, for example. If VGA format of the requested media program is available in the memory unit of the media server component 131, the media program is served. If not available in the memory, the highest quality of stored media program is retrieved, processed and converted to a VGA format and served. If the user, after a while, changes the window screen size, refresh rate or any other A/V characteristic, the media server component 131 immediately reciprocates by allocating a higher data transfer rate and serving the media program in the corresponding A/V format.

Although each of the media server component 131, 133, 135, 137, 139, 141, 147 and 153 are fully functional via circuitry and processing operations, full media server component functionality might also be distributed in portions across two or more of the components 133, 135, 137, 139, 141, 147 and 153. Similarly, some or all of the media server components 131, 133, 135, 137, 139, 141, 147, and 153 might only operate on a reduced set of media formats (that is, audio formats and/or video formats) and produce a limited set of output media formats. If such is the case and either the input media format or the required output format is not supported, the input media program will be routed to another of the media server components 131, 133, 135, 137, 139, 141, 147, and 153 for processing. For example, the media server component 139 of the video player 127 might receive video having an NTSC (National Television System Committee) format with associated audio in a Dolby 5.1 surround sound format from a Digital Video Disk (DVD). The media server component 139 converts the received formats into a QVGA (Quadrature Video Graphics Array) video format and MPEG-1 (Moving Pictures Expert Group) audio format in real time or may store it in memory. Although such audio and video industry standard formats might be acceptable for wireless delivery to the PDA 113 for playback, a video system such as the cell phone 115 might require proprietary formats. In such case, the video player 127 routes the QVGA and MPEG-1 formats to another media server component that is configured to handle such proprietary formats before finally delivering them to the cell phone 115 for consumption. One of the media server components 133, 135, 137, 139, 141, 147 and 153 in the path detects any change in conditions of the media network such as estimated available data transfer rate, media player display characteristics and the user preferences that changed some period during the transmission and the changes to the video format are incorporated immediately. Thus, some of the media server components 131, 133, 135, 137, 139, 141, 147 and 153 in the path adaptively serve the requested program with desired characteristics.

Likewise, audio and video could take different formatting pathways to get to the video system. The video might pass from a first video source to a second for a first stage translation, and then to a second video source for final translation before final deliver to the consuming video system. At the same time, the audio might be translated at the first video source and delivered directly to the consuming video system. Alternatively, instead of direct delivery, the translated audio might be relayed along with the video through the second video source to the consuming video system.

Although not shown, a separate piece of media server component equipment might provide dedicated and centralized media server component support for the video network 105. That is, the media server components 131, 133, 135, 137, 139, 141, 147, and 153 are either integrated into the media device with rest of the functional circuitry of the video systems, or housed independently before media device's input circuitry. Such equipment might comprise a dedicated computer server located in proximity of the media devices or might be available remotely, e.g., on the Internet.

Some of the media players 111, 113, 115, 117, 119, 121, 123, 127, 129, 149, and 151 may not have any of the media server component functionality, but receive processed media content uniquely suited for the respective video system via the media server component 137 in the STB 125. Similarly, the media sources 127, 129, and 149 may not have any media server component functionality, but source a standard video program to the media server component 137 in the STB 125 and the media server component 137 adaptively delivers these media programs to any or all of the recipient media players. In summary, the adaptive video processing and delivery itself may be done exclusively in the media server component 137 of the STB 125, and the processed video and audio formats communicated to the media players 111, 113, 115, 117, 119, 121, 123, 127, 129, 149, and 151. Another possibility is that of video processing done upstream at the remote media source 109, by the media server component 131 and delivered to the STB 125 in a format desired required or selected for the consuming media player.

Figure 2:
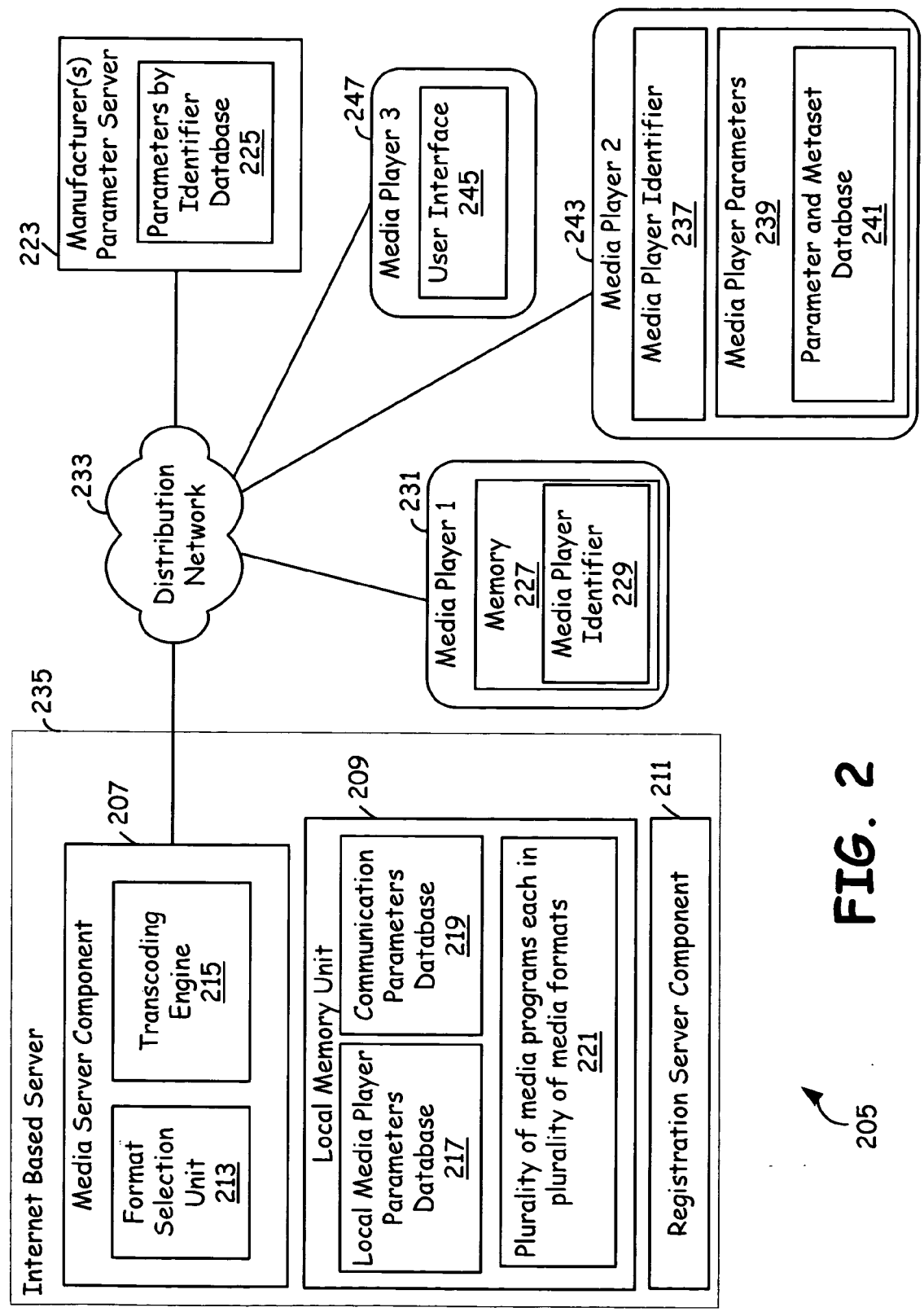
FIG. 2 is a block diagram illustrating an embodiment of a typical Internet based server in a media distribution and consumption infrastructure, when a media server component is incorporated, according to the present invention.

FIG. 2 is a block diagram illustrating an embodiment of a typical Internet based server in a media distribution and consumption infrastructure, when a media server component is incorporated, according to the present invention. The media distribution and consumption network comprises of an Internet based server 235, plurality of client media players 231, 243 and 247, manufacturer(s) parameter server 223 and a distribution network 233. The Internet based server 235 comprises of a media server component 207, local memory unit 209 and registration server component 211. The media server component consists of a format selection unit 213 and transcoding engine 215. The local memory unit 209 consists of a local media player parameters database 217, communication parameters database 219 and plurality of media programs each in plurality of media formats 221. The manufacturer(s) parameter database 223 consists of parameters by identifier database 225. The client media player-1 231 comprises of memory 227, which further consists of a media player identifier. The client media player-2 consists of media player identifier 237 and media player parameters 239. The media player parameters 239 further comprises of a parameters and metaset database 241. The media player-3 247 comprises of a user interface 245. The media players 231, 243 and 247 represent wide variety of media players 111, 113, 115, 117, 119, 121, 123, 127, 129, 149 and 151 (in FIG. 1). However, in actuality each of the media players 231, 243 and 247 may comprise of one or more of the memory 227, media player identifier 237, media player parameters 239 and/or user interface 245.

The Internet based server 235, manufacturer(s) parameter server 223 and the media players 231, 243 and 247 are communicatively coupled via a distribution network 233. The distribution network 233 may be a satellite based communication network, fiber option communication network, twisted-pair telephony network, cellular network, wireless radio network, television broadcasting network and industry standard or proprietary networks or links.

In an embodiment, the Internet based server 235 retrieves media player parameters from plurality of client media players and stores them in the local media player parameters database 217 for the future use of adaptive delivery. The retrieval of media player parameters are handled by the registration server component 211, during registration of the media player 231, 243 or 247 with the Internet based server 235. If the media server parameters are not available with the media players, such as media player-1 231, then the registration server component 211 retrieves the media player identifier. The retrieved media player identifier is then used to retrieve media player parameters from the manufacturer(s) parameter server 223.

For example, during the registration, the registration server component 211 retrieves media player identifier of the media player-1 231. The media player identifier 229 is located in the memory 227 of the media player-1 231. The media player-1 231 may represent simple portable media players such as a wristwatch with media functionality 117 or a portable audio system 151 (of FIG. 1). These relatively simple devices may not have a user interface to interact with the Internet based server 207 or media player parameters stored in memory. The user of the media player-1 231 may register with the Internet based server 207. During such registration of the media player-1 231, the registration server component 211 interacts with the manufacturer server 223, retrieves the media player parameters from the parameters by identifier database 225, and stores it in the local media player parameters database 217.

During the registration with the Internet based server 235, the registration server component 211 retrieves media player parameters and/or media player identifier directly from the media player device if available. This retrieved information regarding the client devices are stored in the local media parameters database 217. For example, during the registration of the media player-2 243, the registration server component 211 may retrieve the media player parameters and media player identifier from the media player parameters 239 and media player identifier 237, respectively. If not all the required parameters are available in the media player parameters 239, the registration server component 211 may interact with the manufacturer parameter server 223 using the media player identifier and retrieve the necessary information. The registration server component 211 may further obtain user preferences, in case of certain devices such as media player-3 247, via user interface 245. This information is stored in the local media player parameters database 217.

The media server component 207 gathers communication parameters required for adaptive delivery of the media programs based upon: (a) actual delivery conditions experienced when trying to deliver in one format; (b) test signals in advance of delivery; (c) signals received from the recipient or tracked by the sender; (d) buffer conditions on the recipient system. The communication characteristics thus periodically gathered are stored in the communication parameters database 209. The information regarding communication characteristics in conjunction with the media player parameters allows the media server component 207 to estimate the transmission bit rate in real time.

Figure 3:
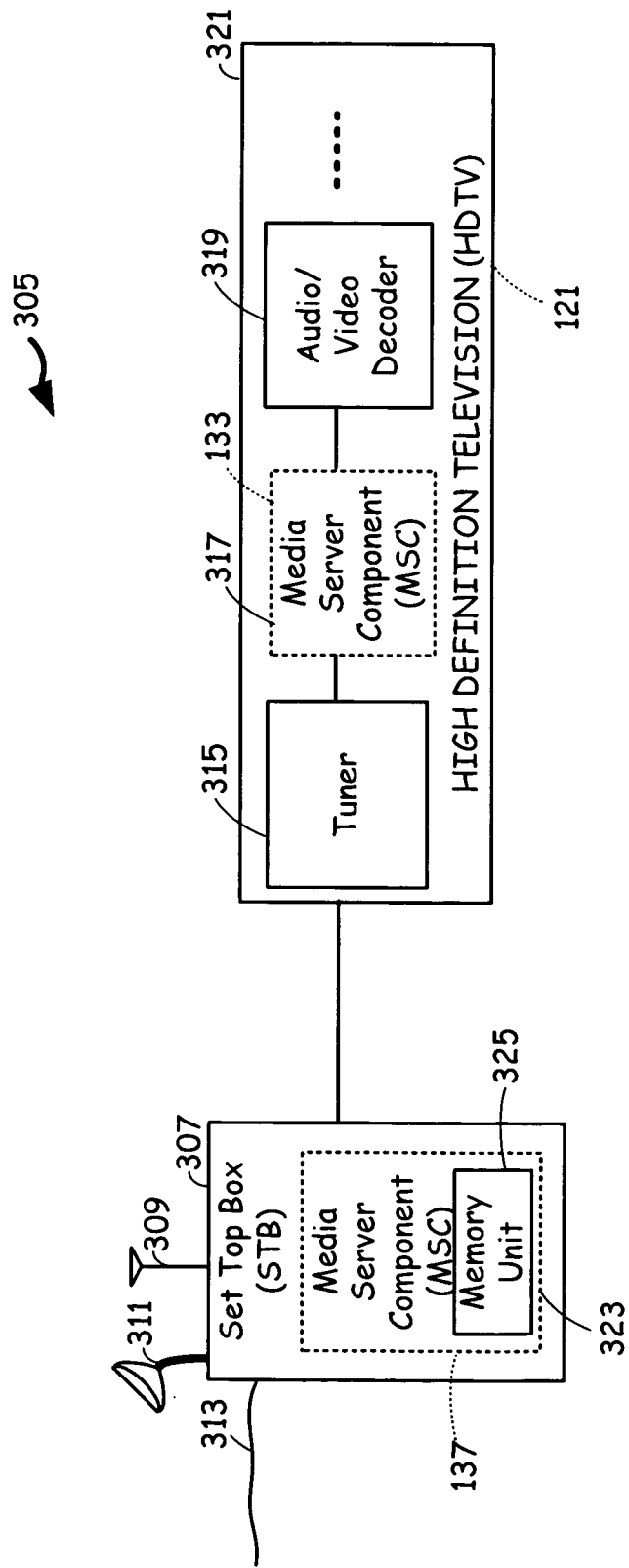
FIG. 3 is a block diagram illustrating an embodiment of a media server component in which components of media server component being distributed into one or more of the video processing systems, in accordance with the present invention.

FIG. 3 is a block diagram 305 illustrating an embodiment of a media server component in which components of media server component being distributed into one or more of the video processing systems, in accordance with the present invention. FIG. 3 illustrates an example of a media server component 323 (137 of FIG. 1) of STB 307 functioning along with another media server component 317 (133 of FIG. 1) of TV 321 (121 of FIG. 1) to achieve adaptive delivery of a media program. The television 321 shown in FIG. 3 may be any digital television such as a plasma television, LCD flat television or high definition television (HDTV). The exemplary television in FIG. 3 also shows a tuner 315 and A/V decoder 319, which usually are a front end functional blocks of a digital television, and are not a part of media server component 317 described in this invention. The STB 307 adaptively delivers media server component 323 processed media program received via any one or more of a WLAN, a LAN, a cable television network 313, a dish antenna 311, and another antenna 309. The media server component 323 of STB 307 contains a large memory unit 325 to store digital media programs. The STB 307 is communicatively coupled with the TV 321 via a cable or via a wireless connection.

Video input to the media server component 323 is received from the STB 307, video player 127 (FIG. 1), PVR 129 (FIG. 1), computer 123 (FIG. 1) and other local and remote media sources 109 (FIG. 1). The remote media sources 109 include an Internet based vendor, a cable provider or a satellite based television signal provider. The input video signal to the media server component 323 may be an analog NTSC (National Television Systems Committee) television signal, an analog PAL (Phase Alternation Line) television signal, a downloaded MPEG (Moving Picture Experts Group) file, a HDTV broadcast signal or any other standard digital broadcast signal.

In one embodiment, if the input A/V signals to the media server component 323 are of analog format, they are converted to a digital format appropriately. Some of the media programs and/or live broadcast programs obtained from an Internet based vendor, a cable provider or a satellite based television signal provider are stored in the memory unit 325 of the media server component 323, as per user directives. Each media program may be stored in memory unit 325 in multiple digital video formats such as an MPEG file, for example. Further, the media server component 323 obtains the media characteristics of the TV 321, such as screen refresh rate, by querying the media server component 317 of TV 321 beforehand.

When the TV 321 requests for a media program or a live broadcast, the media server component 323 appropriately retrieves the media program from the memory unit 325 and broadcasts it with in an operational region using a television channel frequency (a television channel 3, for example). If on the other hand, the TV 321 requests for a live program, the media server component 323 delivers it in a similar fashion. For delivering the program adaptively, the media server component 323 periodically queries media server component 317 of TV 321 and delivers an A/V format according to the available data transfer rate, user preferences in the TV 321 among other factors described with reference to the FIG. 1. When the tuner 315 is tuned to the STB 307 broadcast frequency, the tuner outputs a digital media stream. The media server component 317 recognizes the A/V format broadcasted by the STB 307 and appropriately adjusts the picture quality, screen size, audio formats, and other A/V factors of the output. Rest of the TV 321 functional blocks, as per design, allow the A/V presentation of the media server component 317 output.

Figure 4:
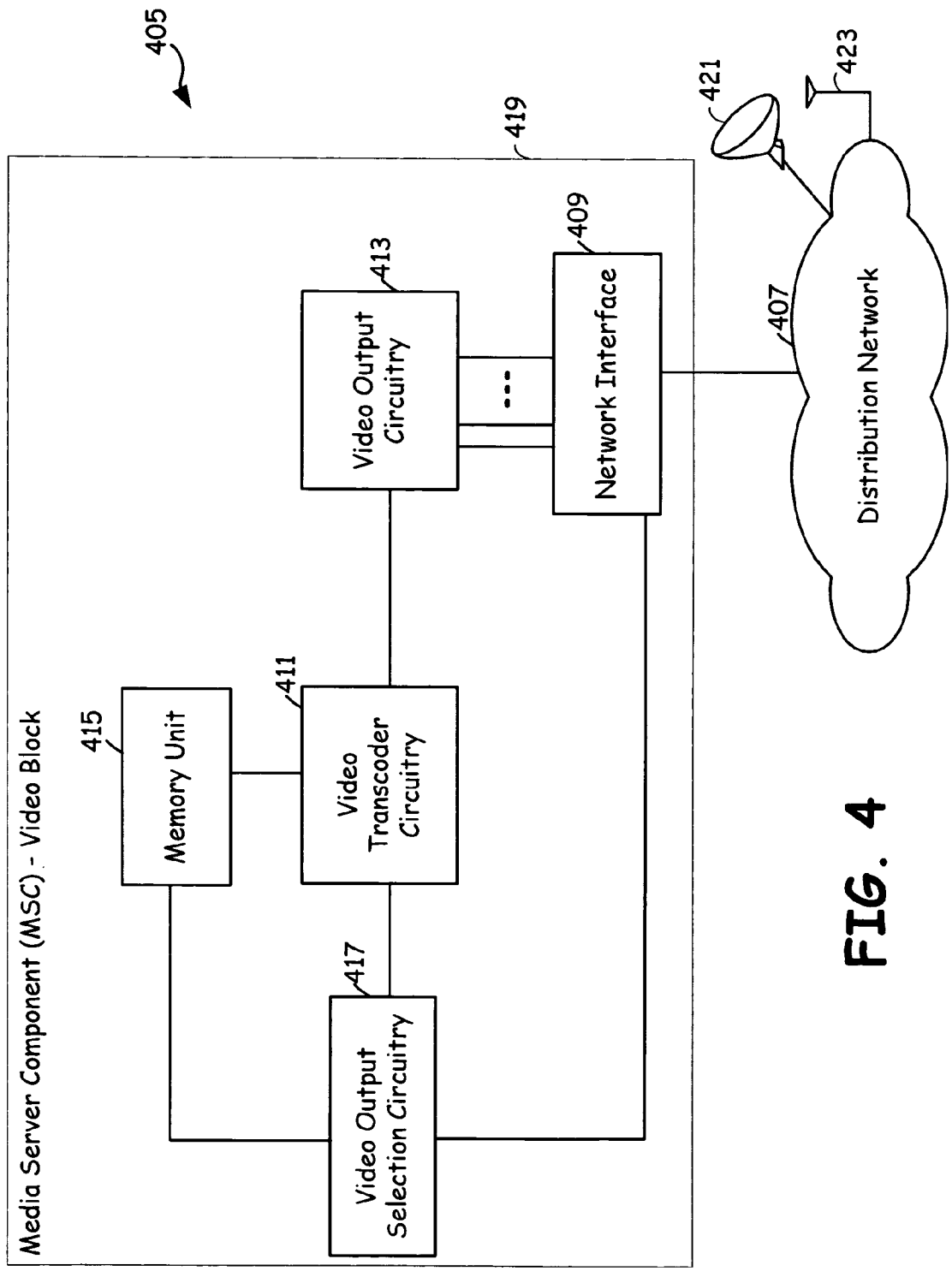
FIG. 4 is a block diagram illustrating the functional details of the video processing portion of a media server component, when connected to a distribution network.

FIG. 4 is a block diagram 405 illustrating the functional details of the video processing portion of a media server component, when connected to a distribution network. A media server component 419 (some or all of elements shown within each of the media server component components 131, 133, 135, 137, 139, and 141 of FIG. 1) comprises of a network interface 409, video transcoder circuitry 411, video output circuitry 413, video output selection circuitry 417, and memory unit 415.

The media server component 419 is communicatively coupled to a distribution network 407, via the network interface 409 of the media server component 419. The distribution network 407 delivers media programs from the media server component 419 via a dish antenna 421, any other antenna 423 or a coaxial cable. The distribution network 407 includes infrastructures of a cable, satellite, Internet, Intranet, cellular, wireless local area network (WLAN) and/or local area network (LAN). The media programs delivered by the media server component 419 via distribution network 407 reach a large number of media players in a large network such as an Internet based server and network, or may reach only few media players in a small network such as in a home environment.

Video output selection circuitry 417, upon a request from a media player 111, 113, 115, 117, 119, 121, 123, 125, 127 and/or 129 (in FIG. 1) for a media program, communicates with the media player and retrieves media player parameters and/or media player identifier of the device. The retrieved media player identifier may comprise of model number, type of device, manufacturer of the device. If available the media player parameters such as screen size, refresh rate required, frame rate, audio format information, user preferences at the recipient media player's end (such as region of interest adaptation, resizing of the windows, or desired quality of display) are also retrieved. If the information regarding screen size, refresh rate required, frame rate and audio format information are not available with the device, the video output selection circuitry 417 verifies with a look-up table in a database, and based upon the information of manufacturer and device model number and extracts this information. Alternatively, the video output selection circuitry 417 may obtain A/V format information by communicating model number with the manufacturer of the device, via an Internet network. This information forms one of the bases of the adaptive delivery of the program.

Once all the preliminary information required is gathered, the video output selection circuitry 417 estimates the available data transfer rate and determines on the audio and video format of the media program, before actual delivery takes place. Then, the video output selection circuitry 417 searches in the memory unit 415 if the media program with the determined audio and video format is readily available. If available, video portion of the media program is delivered via video transcoder circuitry 411. In this case, the video transcoder circuitry 411 does not need to alter video portion of the media program retrieved from memory unit 415.

If the determined A/V format is not available, the video output selection circuitry 417 prompts the video transcoder circuitry 411 to retrieve a first A/V format (that is, one of the available formats of the media program, with highest quality) from the memory unit 415 and transcode it in real time to a format determined as mentioned above.

The video transcoder circuitry 411 is a process intensive circuitry capable of decoding the incoming video signal retrieved from the memory unit 415. Once the video information is decoded, the video transcoder circuitry 411 processes the video signal to encode again into a video format determined by the video output selection circuitry 417. In effect, the video transcoder circuitry 411 translates video signal from the memory unit 415 into a different video format, having screen resolution, frame and refresh rates determined by the procedure mentioned above. The video transcoder circuitry 411 decimates the input video signal when it is necessary to produce an output video signal having lesser resolution. When it is required to output a higher resolution video signal than that of input video signal, the video transcoder circuitry 411 interpolates the input video signals. If, at any time during the delivery of the media program, the requesting media player interrupts by changing the requirements of A/V formats, the output selection circuitry 417 in conjunction with video transcoder circuitry 411, responds appropriately to deliver a different A/V format.

When plurality of media players request for various media programs, based upon the output of the video transcoder circuitry 411, the video output circuitry 413 segregates the video signals into plurality of video output signals each complying with the selection of the video output selection circuitry 417 and delivers them to the requesting media players. The network interface 409 interfaces between the video output circuitry 413 and the distribution network 407 and delivers the video signals to the requesting media players.

For example, the requesting media player may be a HDTV, which is interacting with the video output selection circuitry 417 via a cable distribution network 407. When the request for a media program is made, upon retrieving all the necessary information about the requesting HDTV, the video output selection circuitry 417 determines the A/V format of the media program to be delivered. The user may decide upon the A/V format based on the type of media program and may program the HDTV accordingly. For example, during a news commentary, the region off-center of the display may not be of any interest. In this case, the video transcoder circuitry 411 adaptively alters area of interest processing parameters of the output video signals based upon available data transfer rate to a corresponding client media player and the video transcoder circuitry 411 reduces area of interest size in response to a reduction of available data transfer rate. On the other hand, if the user decides to watch a movie, the user may prompt the HDTV to request for a highest quality A/V format possible.

Figure 5:
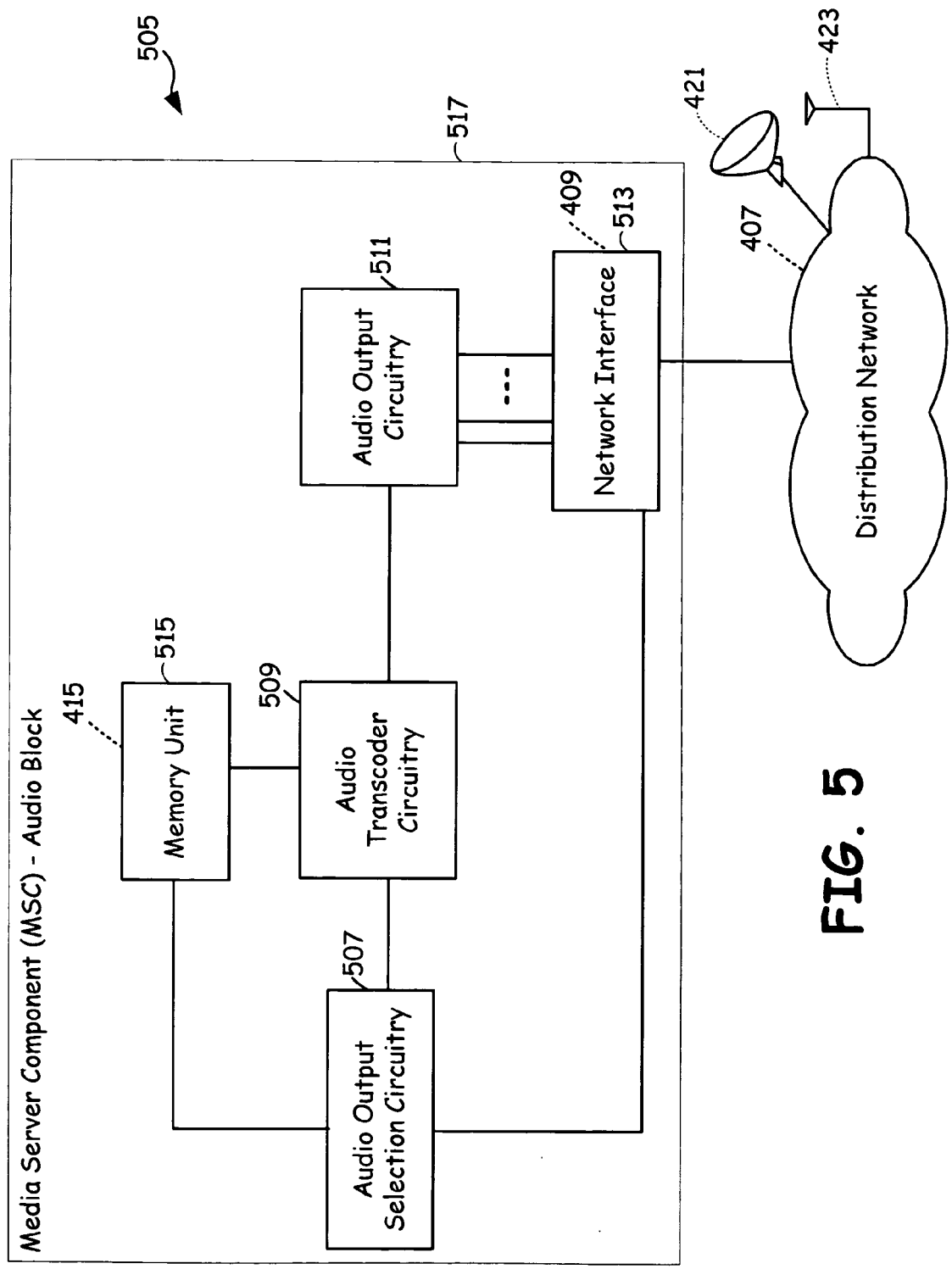
FIG. 5 is a block diagram illustrating the functional details of the audio processing portion of a media server component, when connected to a distribution network.

FIG. 5 is a block diagram 505 illustrating the functional details of the audio processing portion of a media server component, when connected to a distribution network. The media server component (131, 133, 135, 137, 139, 141, 147, or 153 of FIG. 1) circuitry in entirety comprises of the video processing circuitry 419 shown in FIG. 4 as well as the audio processing circuitry 517 shown in FIG. 5. The audio block 517 of the media server component comprises of an audio output selection circuitry 507, audio transcoder circuitry 509, and audio output circuitry 511. The memory unit 515 shown in FIG. 5, which contains the media program with and/or video portions, is same as the memory unit 515 shown in FIG. 4. Similarly, the network interface 513 (in FIG. 5) is same as the network interface 409 shown in FIG. 4. The distribution network 407, together with the dish antenna 421 or any other antenna 423 are same for a media server component 419 (FIG. 4) and 517 (FIG. 5).

Audio output selection circuitry 507, being one portion of the media server component (131, 133, 135, 137, 139, 141, 147 and 153 of FIG. 1) circuitry, work in conjunction with the video output selection circuitry 417 (FIG. 4) to retrieve audio format information regarding the requesting media player. The audio format information may comprise of one of a mono, stereo, multi-channel surround sound formats or any other proprietary audio formats. If the information regarding audio format is not available with the device, the audio output selection circuitry 507 obtains these information either via its own look-up table or by communicating model number to the manufacturer of the device, via an Internet network. A database containing the look-up table is a part of the media server component (131, 133, 135, 137, 139, 141, 147, and 153 of FIG. 1) and may comprise of manufacturer details, model numbers, and the A/V specifications of a plurality of devices. Based upon the audio format information collected and the estimated available data transfer rate, the audio output selection circuitry 507 in real time determines the audio format to be delivered to the requesting media player.

Then, the audio output selection circuitry 507 searches in the memory unit 515 whether the media program with the determined audio format is readily available in memory unit 517. If available, audio portion of the media program is delivered via audio transcoder circuitry 509 and when available in memory unit 515, the audio transcoder circuitry 509 does not alter audio portion of the media program retrieved from memory unit 515 in any way.

When the audio format determined by the audio output selection circuitry 507 is not available in memory unit 515, the audio transcoder circuitry 509 transcodes one of the first media program available in the memory unit 515 and delivers to the requesting media player in real time.

The audio output circuitry 511 segregates the audio portions into plurality of audio output signals each complying with the selection of the audio output selection circuitry 507 and delivers them to a plurality of requesting media players. The network interface 513 (409 in FIG. 4) interfaces between the audio output circuitry 511 and the distribution network 407 and delivers the audio signals to the requesting media players.

Figure 6:
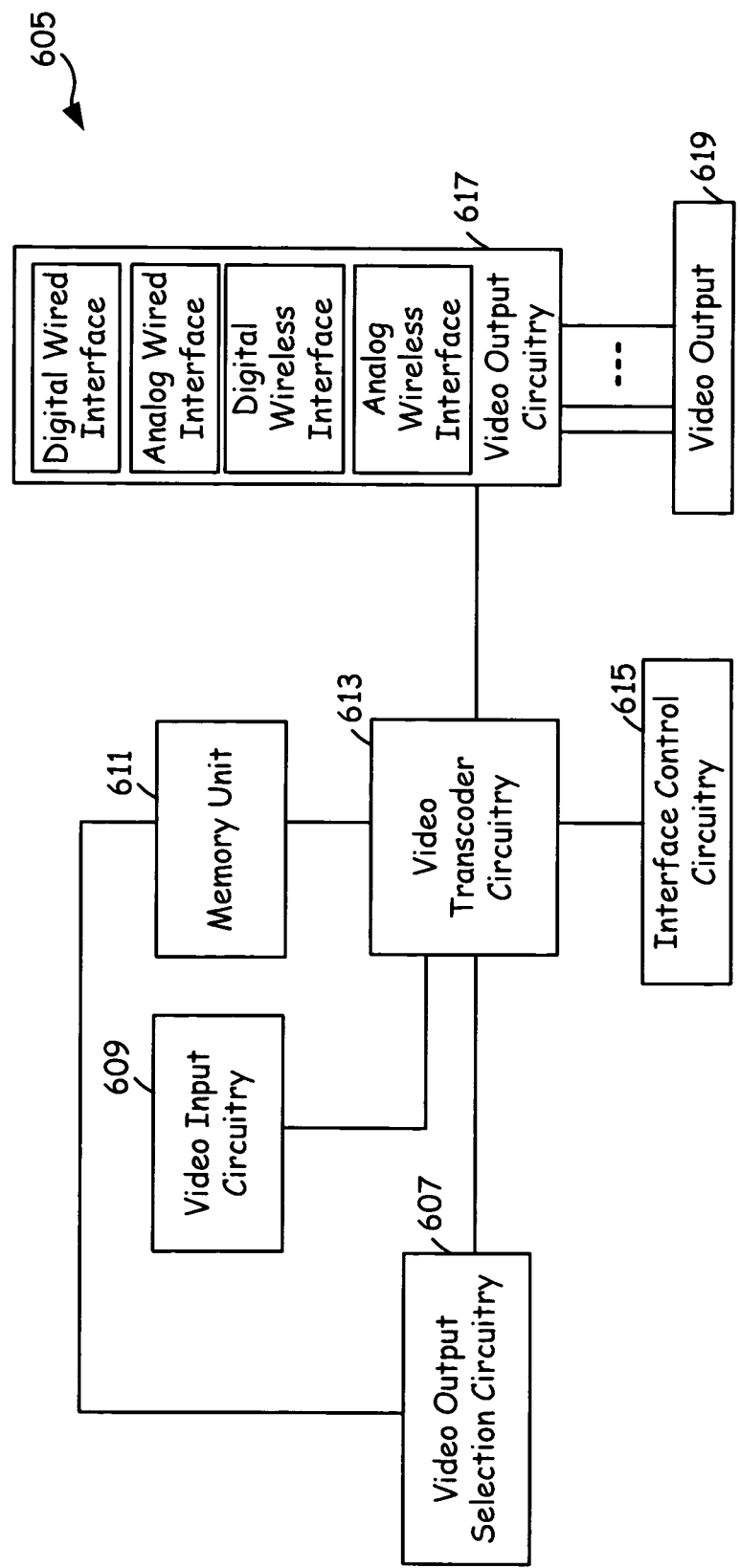
FIG. 6 is a block diagram illustrating the circuitry involved in the video processing portion of a set top box (STB) that incorporates a media server component.

FIG. 6 is a block diagram 605 illustrating the circuitry involved in the video processing portion of a set top box (STB) that incorporates a media server component, in accordance with the present invention. The media server component 137 (FIG. 1) video processing portion 605 of the STB 113 (FIG. 1) circuitry comprises of a video output selection circuitry 607, video transcoder circuitry 613, interface control circuitry 615, video input circuitry 609, memory unit 611, video output circuitry 617 and video output 619. The video output circuitry 613 further comprises of four interfaces, viz., digital wired interface, analog wired interface, digital wireless interface and analog wireless interface for adaptively delivering media programs to a plurality of media players within the operational region, either via a LAN (Local Area Network) or WLAN (Wireless Local Area Network).

The set top box 125 receives media programs, either in real time or background (stored programs), from a plurality of sources such as a television 121, computer 123, video player 127, personal video recorder 129, audio player 149, remote media source 109 and other local and remote media sources via a distribution network 107 (as described with reference to the FIG. 1). The video input circuitry 609 facilitates in receiving these signals and if programmed by the user, stores in memory unit 611 (via video transcoder circuitry 613). If the received media programs are of analog format, the A/D (Analog to Digital) converter built into the video input circuitry 609 converts to a digital format before storing it. In addition to storing of the media programs in memory unit 611, the received signal may also be made available to an external storage unit (not shown) in the received A/V format. The video input circuitry 609, further facilitates in determining user rights of the received media programs and directs the user to take action authenticating and obtaining permission, if the media programs downloaded are on a pay-per-view basis.

Video output selection circuitry 607 receives request from a plurality of media players 111, 113, 115, 117, 119, 121, 123, 127 and 129 (in FIG. 1) for media programs. In response, the video output selection circuitry 607 interacts with the media players and retrieves media player parameters and/or media player identifier of the device. The retrieved information may contain model number, type and manufacturer of the device; and if available the information regarding screen size, refresh rate required, frame rate, audio format information, user preferences at the recipient media player's end (region of interest adaptation, resizing of the windows, or desired quality of display, for example). If the information regarding screen size, refresh rate required, frame rate and audio format information are not available with the device, the video output selection circuitry 607 verifies with a look-up table in a database, and based upon the information of manufacturer and device model number and extracts this information. Alternatively, the video output selection circuitry 607 may obtain A/V format information by communicating model number with the manufacturer of the device, via an Internet network. This information forms one of the bases of the adaptive delivery of the program.

Once all the preliminary information required is gathered, the video output selection circuitry 607 estimates the available data transfer rate and determines on the audio and video format of the media program, before actual delivery takes place. Then, the video output selection circuitry 607 searches in the memory unit 611 if the media program with the determined audio and video format is readily available. If available, video portion of the media program is delivered via video transcoder circuitry 613. In this case, the video transcoder circuitry 613 does not alter video portion of the media program retrieved from memory unit 611 in any way.

If thus determined A/V format is not available, the video output selection circuitry 607 prompts the video transcoder circuitry 613 to retrieve a first A/V format from the memory unit 611 and transcode it in real time to a format determined as mentioned above. The first A/V format is one of the available formats of the media program, with highest quality.

Typically, video information transmitted is encoded for video compression. The video transcoder circuitry 613 is a process intensive circuitry capable of decoding the incoming video signal received from the video input circuitry 609, for decompression. The video transcoding circuitry 611 handles decompressed video signal on a frame-by-frame basis. Once the video information on frame-by-frame basis is extracted, the video transcoder circuitry 613 processes the video signal, by using a digital signal-processing algorithm, to encode again into a standard video format or a user defined video format. Then, the video transcoder circuitry 611 encodes the decoded video signals in to a plurality of video formats defined by the user and stores in the memory unit 611 if necessary.

The interface control circuitry 615 is an interface between the user and the media server component 137 of the STB 125. It allows user to download media programs from local or remote media sources, and facilitates user to obtain permission to download media programs. The user preferences regarding the A/V formats (either while storing the received programs or while delivering the programs to various media players) are stored in the memory unit (not shown) of the interface control circuitry 615. The interface control circuitry 615 also handles the interfaces in the video output circuitry 617 and facilitates delivery of video signals via appropriate communication channels.

The video output circuitry 617 segregates output of the video transcoder circuitry 613 into a plurality of video signals, based upon the control signals from the video output selection circuitry 607. Further, the video output circuitry 617 transmits them wirelessly in the operational region or sends them via wires, based upon the user input from the interface control circuitry 615. The video output circuitry 617 converts digital video signals to analog format when an analog output is required based upon control input from the interface control circuitry 615. The video output circuitry 617 further comprises of digital wired interface, analog wired interface, digital wireless interface and analog wireless interface. The digital wired interface and the digital wireless interface allow the segregated digital video output to be transmitted via wires or wirelessly. Similarly, the analog wired interface and the analog wireless interface allow analog video output to be channeled to the recipient analog video systems, via wires or wirelessly. All channels of the video output, both analog and digital, are made available at the video output 619 via composite jacks.

Figure 7:
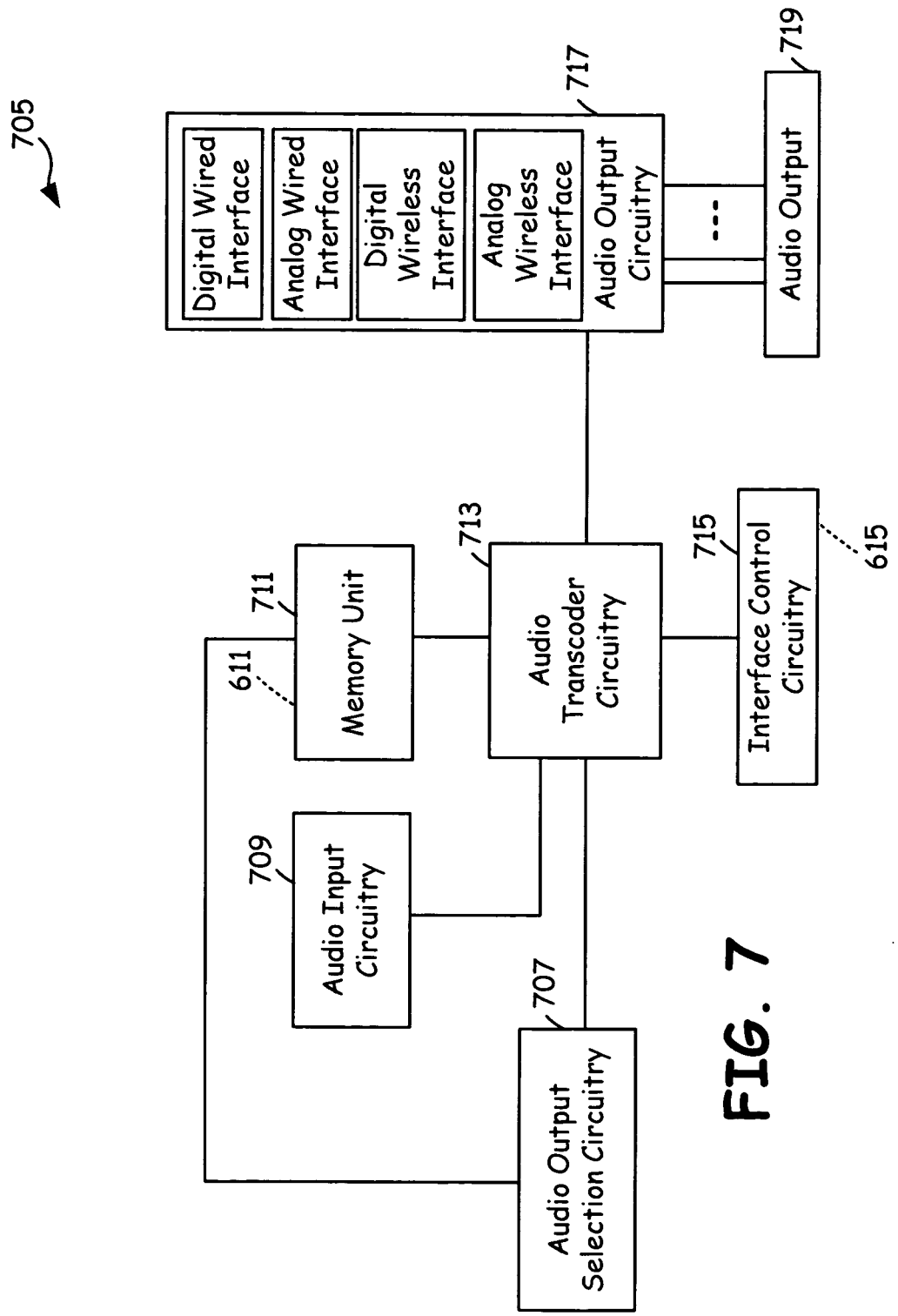
FIG. 7 is a block diagram illustrating the circuitry involved in the audio processing portion of a set top box (STB) that incorporates a media server component.

FIG. 7 is a block diagram 705 illustrating the circuitry involved in the audio processing portion of a set top box (STB) that incorporates a media server component. The video processing portion shown in FIG. 6 together with the audio processing portion shown in FIG. 7 form the circuitry of media server component 137 of the STB 125 (of FIG. 1), according to the present invention. The audio processing portion 705 of the media server component 137 (FIG. 1) comprises of an audio output selection circuitry 707, audio transcoder circuitry 713, audio input circuitry 709, memory unit 711, interface control circuitry 715, audio output circuitry 717 and audio output 719. The audio output circuitry 717 further comprises of digital wired interface, analog wired interface, digital wireless interface and analog wireless interface for adaptively delivering media programs to a plurality of media players within the operational region, either via a LAN (Local Area Network) or WLAN (Wireless Local Area Network). The interfaces of the audio output circuitry 717 work in conjunction with the corresponding interfaces of the video output circuitry 617 shown in FIG. 6. Further, the blocks memory unit 711 and interface control circuitry 715 of the audio processing portion 705 of the media server component 137 (FIG. 1) are same as the blocks 611 and 615 respectively.

The audio input circuitry 709 receives audio portion of the media programs from various sources such as a television 121, computer 123, video player 127, personal video recorder 129, audio player 149, audio system 151, remote media source 109 (shown in FIG. 1), and other local and remote media sources. If the received audio input is of analog form, the analog to digital (A/D) converter (not shown) converts audio signals to a digital form. The received media programs may be stored in the memory unit 711, according to the user preferences via interface control circuitry 715. The received audio content with its input characteristics may be additionally provided to an audio storage unit (not shown).

Audio output selection circuitry 707 work in conjunction with the video output selection circuitry 607 (FIG. 6) to retrieve audio format information regarding the requesting media player. The audio format information may comprise of one of a mono, stereo, multi-channel surround sound formats or any other proprietary audio formats. If the information regarding audio format is not available with the device, the audio output selection circuitry 707 extracts this information by looking into a database containing model number and other manufacturing details or by interacting with manufacturer's server via Internet, for example. The audio format information thus collected and the estimated available data transfer rate form bases for the determination of the audio format to be delivered to requesting media players.

Then, the audio output selection circuitry 707 verifies the availability of the media program with the determined audio format in the memory unit 711. If available, audio portion of the media program is delivered to the audio output circuitry 717 via audio transcoder circuitry 713. When the audio format thus determined is not available in the memory unit 711, the audio transcoder circuitry 713 transcodes one of the first media program available in the memory unit 711 and delivers to the requesting media player in real time.

The audio output circuitry 717 segregates the audio portions into plurality of audio output signals each complying with the selection of the audio output selection circuitry 707 and delivers them to a plurality of requesting media players via audio output 719.

Figure 8:
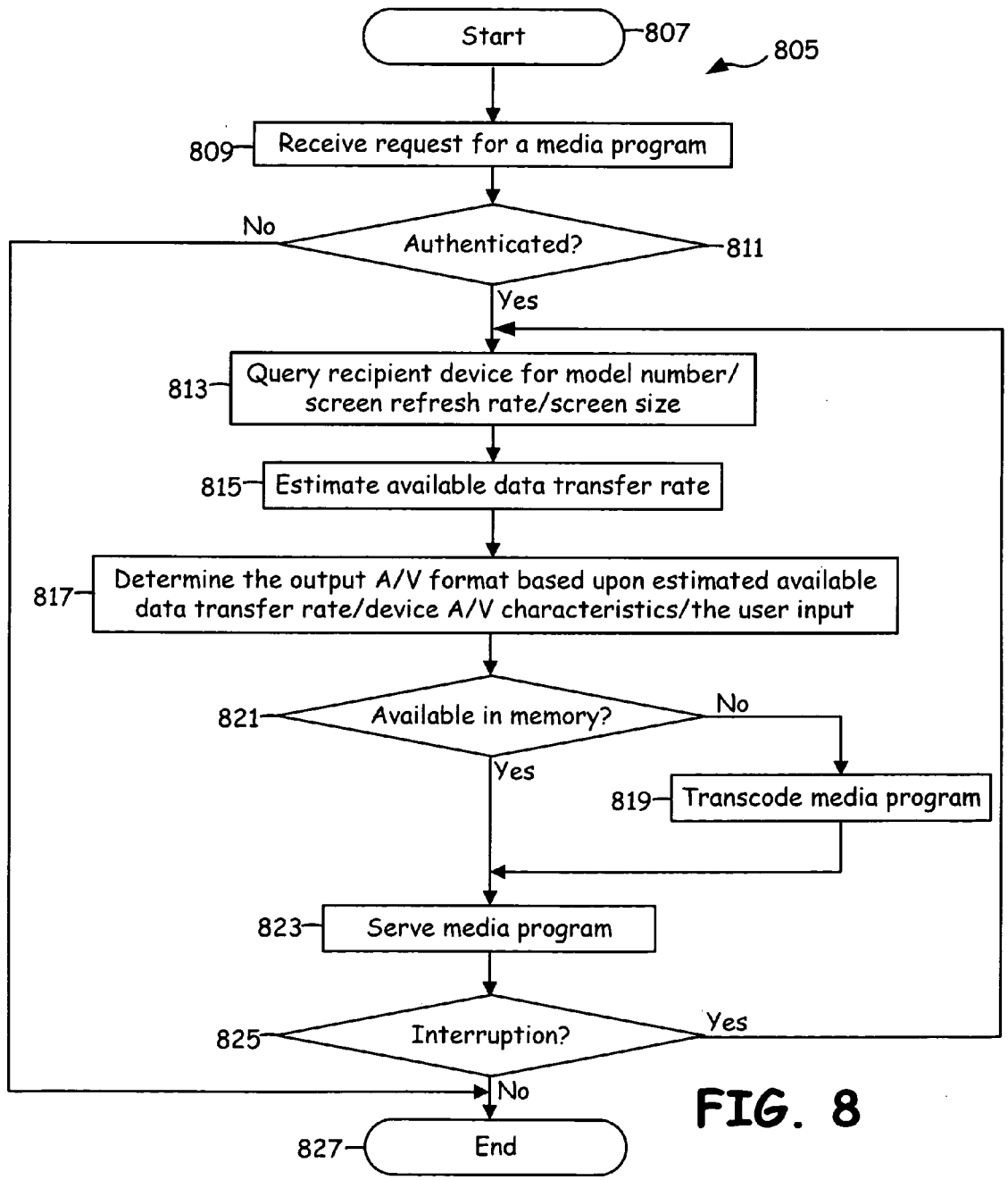
FIG. 8 is a flow diagram illustrating the method involved in media server component receiving request for a media program and adaptively delivering the media program based upon the estimated available data transfer rate, device A/V characteristics and user input, according to the present invention.

FIG. 8 is a flow diagram 805 illustrating the method involved in media server component receiving request for a media program and adaptively delivering the media program based upon the communication characteristics, media player parameters and/or media player identifier and user input, according to the present invention. The method of media server component adaptively delivering media programs to a requesting client media device (or recipient media player) starts at a block 807. At a next block 809, the media server component receives request for a media program.

Then at a next decision block 811, the media server component determines rights of the user to use the media program and follows up a procedure of authenticating for a pay-per-view (described with reference to FIG. 9) media program. If the user could not authenticate or make payments to the media program, the adaptive delivery of the program does not take place and at a block 827, the adaptive delivery ends. Once the authentication procedure is completed, at a next block 813, the media server component queries the recipient device for any information regarding the device specifications. The device information may comprise of model number, type of the device, manufacturer of the device; and if available the information regarding screen size, refresh rate required, frame rate, audio format information, user preferences at the recipient media player's end such as region of interest adaptation, resizing of the windows, or desired quality of display.

Then, at a next block 815, the media server component estimates available data transfer rate. The information thus collected regarding the device, together with the information of the available data transfer rate, facilitates the media server component to take decision regarding the format of the audio and video contents of the media program and to deliver the media program adaptively. At a next block 817, the media server component determines the output audio and video format based upon the estimated data transfer rate, recipient device audio and video characteristics and the user preferences at the recipient device's end.

At a next decision box 821, the media server component verifies if the audio and video format determined at the block 817 is readily available in the memory. Regarding each media program stored in the memory unit of the media server component, the media server component stores many different standard formats based on most likely scenarios of A/V format delivery. At the decision box 821, if not readily available in the memory, the media server component transcodes the media program in real time at a block 819 to meet the requirements of the A/V formats determined in the block 817.

Then, at a next block 823, the media program requested by the media device is served. If the transcoded media program or the pre-transcoded media program available in the memory unit of the media server component does not fit, the media device or another intermediate device may fit in the video on the recipient media device's screen.

If there are any interruptions to the adaptive delivery of the media program, at a next decision block 825, the media server component repeats the steps of 813 to 823. The interruption may occur because of changes in the available data transfer rate or user preferences at the recipient media device's end. If not, the entire procedure ends at the next block 827, after the adaptive delivery of the media program is completed.

Figure 9:
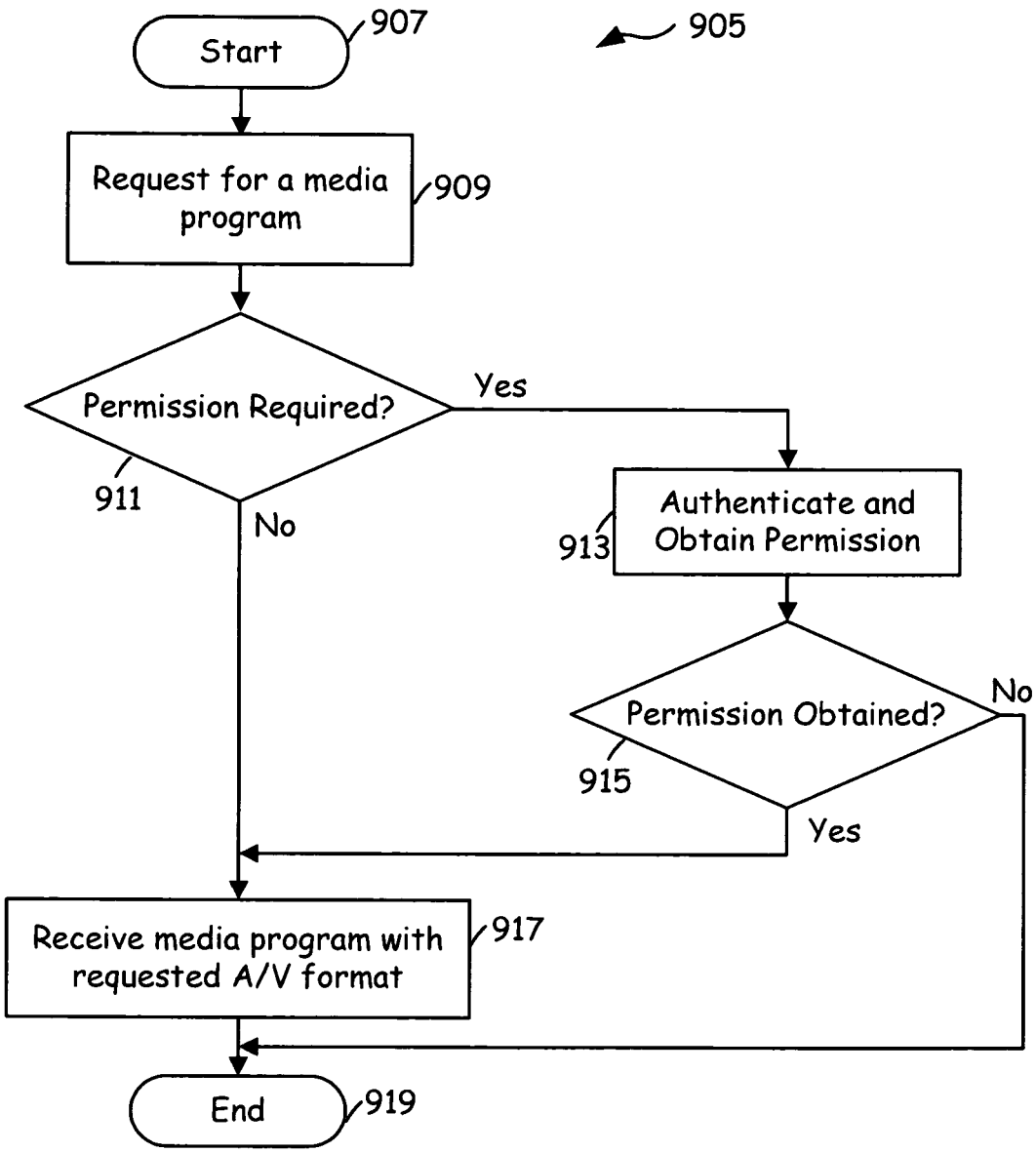
FIG. 9 is a flow diagram illustrating the method used by the recipient device, by authenticating and obtaining permission to receive media program on a pay-per-view basis.

FIG. 9 is a flow diagram illustrating the method used by the recipient device, by authenticating and obtaining permission to receive media program on a pay-per-view basis. The flow chart 905 exemplifies the process of receiving a pre-recorded or live media program from the Internet on a pay-per-view basis.

The processes of obtaining a permitted media program starts at block 907. Then, at a next block 909, the user requests for a media program. For this, the user logs on to a website of choice in the Internet using a web browser and selects the desired programs from a list provided by the media program provider. Then, the user requests to download selected programs by clicking with the mouse on the respective buttons.

Then, at a next decision block 911, the media server component decides whether there is a requirement of permission to the programs selected. If yes, at a next block 913, the user provides all the authentication and billing information, such as name, address and the paying methods, to the media program provider through the website pages. For making payments for the user permits for the video programs, the user needs to provide all the necessary information through the media program provider's website. If, at the block 911, there is no need for permission to download media program adaptively, the process jumps to a next block 917.

Then, at a next decision block 915, a decision is taken regarding whether the user has obtained permission. If the user has not given all the necessary information for billing or does not make payment, the process of downloading ends at a block 919.

If at the decision block 915, the user provides all the necessary information and makes payment, the user is allowed to download the media program. Then, the process of downloading ends at the block 919.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A media server operable to serve video programs to a plurality of client media players across at least one distribution network, the media server comprising:
a network interface communicatively coupled to the at least one distribution network;
a memory unit operable to store the video programs;
video output selection circuitry communicatively coupled to the network interface and to the memory unit and operable to receive respective manufacture/model numbers from each of the plurality of client media players, to access a look-up table using the manufacture/model numbers to retrieve media player parameters for each of the plurality of client media players, to determine communication characteristics for delivery of content of the video programs to each of the plurality of client media players, and to make video format selections for each of the plurality of client media players based thereupon, the look-up table including two or more of: model number, type of device, manufacturer of client media player, screen size, refresh rate required, frame rate, audio format information, user preferences, resizing of windows and desired quality of display;
video transcoder circuitry communicatively coupled to the memory unit and to the video output selection circuitry and operable to transcode video content of the video programs to a plurality of video formats based upon differing video format selections to produce at least two differing video signals for at least two requesting client media players, the video transcoder circuitry adaptively adjusting at least one video format of the video content when the media player parameters or the determined communication characteristics of at least one of the at least two requesting client media players changes; and
video output circuitry communicatively coupled to the video transcoder circuitry and to the network interface and operable to communicatively output the at least two differing video signals to the at least two requesting client media players.

2. The media server of claim 1, further comprising:
audio output selection circuitry communicatively coupled to the network interface and operable to receive audio format information regarding the plurality of client media players and to make audio format selections based thereupon;

audio transcoder circuitry communicatively coupled to the memory unit and to the audio output selection circuitry and operable to transcode audio content of the video programs to a plurality of audio formats based upon the audio format selections, the media player parameters and the communication characteristics to produce at least two differing audio signals for at least two requesting client media players; and audio output circuitry communicatively coupled to the audio transcoder circuitry and to the network interface and operable to communicatively output the at least two differing audio signals to the at least two requesting client media players.

3. The media server of claim 2, wherein the audio output selection circuitry is operable to select a language for presentation by a requesting client media player.

4. The media server of claim 1, wherein the video transcoder is operable adaptively to alter, based upon available data transfer rate to a requesting client media player, one or more of:
a frame resolution of the video signal;
a frame refresh rate of the video signal; and
a viewing window size.

5. The media server of claim 1, wherein the video transcoder is operable to adaptively alter an area of interest processing based upon available data transfer rate to a requesting client media player.

6. The media server of claim 5, wherein in adaptively altering the area of interest processing, the video transcoder circuitry is operable to:
reduce off-center screen resolution in response to a reduction of available data transfer rate; and
reduce area of interest size in response to a reduction of available data transfer rate.

7. The media server of claim 1, wherein the communication characteristics indicate an estimate of available data transfer rate.

8. The media server of claim 1, wherein the video formats are selected from the group consisting a VGA (Video Graphics Array) format, a QVGA (Quadrature Video Graphics Array) format, a HDTV (High Definition TeleVision) format, a three dimensional format, and an analog standard format.

9. The media server of claim 1, wherein the video output circuitry unicast delivers each video signal to a requesting client media player.

10. The media server of claim 1, wherein the video output circuitry serves the video signal on a pay-per-view basis.

11. The media server of claim 1, wherein the media server comprises one of a set top box and an Internet server.

12. A method for operating a media server to serve video programs to a plurality of client media players across at least one distribution network, the method comprising:
receiving from the plurality of client media players respective manufacture/model numbers;
accessing a look-up table based upon the manufacture/model numbers to retrieve media player parameters for each of the plurality of client media players, the look-up table including two or more of: model number, type of device, manufacturer of client media player; screen size, refresh rate required, frame rate, audio format information, user preferences, resizing of windows and desired quality of display;
determining communication characteristics for delivery of content of the video programs to each of the plurality of client media player and making video format selections for each of the plurality of client media players based thereupon and when the determined communication characteristics change, adaptively adjusting at least one of the video format selections;
transcoding video content of the video programs to a plurality of video formats based upon differing video format selections to produce at least two differing video signals for at least two requesting client media players; and
transmitting the at least two differing video signals to the at least two requesting client media players.

13. The method of claim 12, further comprising:
receiving audio format information regarding the plurality of client media players and making audio format selections based thereupon;
transcoding audio content of the video programs to a plurality of audio formats based upon the audio format selections, the media player parameters and the communication characteristics to produce at least two differing audio signals for at least two requesting client media players; and
communicatively outputting the at least two differing audio signals to the at least two requesting client media players.

14. The method of claim 13, further comprising selecting a language for presentation by a requesting client media player.

15. The method of claim 12, further comprising one or more of, based upon available transfer rate to a requesting client media player:
adaptively altering a frame resolution of the video signal;
adaptively altering a frame refresh rate of the video signal; and
adaptively altering a viewing window size.

16. The method of claim 12, further comprising adaptively altering an area of interest processing based upon available data transfer rate to the requesting client media player.

17. The method of claim 16, wherein adaptively altering an area of interest processing based upon available data transfer rate to the requesting client media player comprises one or more of:
reducing off-center screen resolution in response to a reduction of available data transfer rate; and
reducing area of interest size in response to a reduction of available data transfer rate.

18. The method of claim 12, wherein the video formats are selected from the group consisting a VGA (Video Graphics Array) format, a QVGA (Quadrature Video Graphics Array) format, a HDTV (High Definition TeleVision) format, a three dimensional format, and an analog standard format.

19. The method of claim 18, further comprising serving the video signal on a pay-per-view basis.

20. A media server operable to serve video programs to a plurality of client media players across at least one distribution network, the media server comprising:
a network interface communicatively coupled to the at least one distribution network;
a memory unit operable to store the video programs;
video output selection circuitry communicatively coupled to the network interface and to the memory unit and operable to determine media player parameters for each of the plurality of client media players, to determine communication characteristics for delivery of content of the video programs to each of the plurality of client media player, to determine area of interest processing parameters for each of the plurality of client media players, and to make video format selections for each of the plurality of client media players based thereupon;
wherein area of interest processing parameters differ for at least two client media players;

video transcoder circuitry communicatively coupled to the memory unit and to the video output selection circuitry and operable to transcode video content of the video programs to a plurality of video formats based upon the video format selections to produce at least two differing video signals for at least two requesting client media players, and wherein the video transcoder circuitry adaptively adjusts at least one of the plurality of video formats when media player parameters or communication characteristics change for at least one of the at least two requesting client media players;

wherein differing area of interest processing parameters result in transcoded video content having at least one of differing area of interest size and differing off-center screen resolution; and video output circuitry communicatively coupled to the video transcoder circuitry and to the network interface and operable to communicatively output the at least two differing video signals to the at least two requesting client media players.

21. The media server of claim 20, further comprising:

audio output selection circuitry communicatively coupled to the network interface and operable to receive audio format information regarding the plurality of client media players and to make audio format selections based thereupon;

audio transcoder circuitry communicatively coupled to the memory unit and to the audio output selection circuitry and operable to transcode audio content of the video programs to a plurality of audio formats based upon the audio format information, the media player parameters and the communication characteristics to produce at least two differing audio signals for at least two requesting client media players; and audio output circuitry communicatively coupled to the audio transcoder circuitry and to the network interface and operable to communicatively output the at least two differing audio signals to the at least two requesting client media players.

22. The media server of claim 20, wherein the audio output selection circuitry is operable to select a language for presentation by a requesting client media player.

23. The media server of claim 20, wherein the video transcoder is operable to adaptively alter, based upon available data transfer rate to a requesting client media player, one or more of:

a frame resolution of the video signal;

a frame refresh rate of the video signal; and a viewing window size of a requesting client media player.

24. The media server of claim 20, wherein the video transcoder is operable to adaptively alter the area of interest processing in response to a reduction of available data transfer rate by at least one of:

reducing off-center screen resolution; and reducing area of interest size.

25. A method for operating a media server to serve video programs to a plurality of client media players across at least one distribution network, the method comprising:

determining media player parameters for each of the plurality of client media players;

determining communication characteristics for delivery of content of the video programs to each of the plurality of client media players;

determining area of interest processing parameters for each of the plurality of client media players, wherein area of interest processing parameters differ for at least two client media players;

making video format selections for each of the plurality of client media players based upon the area of interest processing parameters, the media player parameters, and the communication characteristics for delivery of content of the video programs for each of the plurality of client media players and, when the determined communication characteristics change, adaptively adjusting at least one the video format selections;

transcoding video content of the video programs based upon the video format selections to produce at least two differing video signals for at least two requesting client media players, wherein differing area of interest processing parameters result in transcoded video content having differing area of interest size and differing off-center screen resolution; and transmitting the at least two differing video signals to the at least two requesting client media players.

26. The method of claim 25, further comprising adaptively altering the area of interest processing by one or more of:

reducing off-center screen resolution in response to a reduction of available data transfer rate; and reducing area of interest size in response to a reduction of available data transfer rate.

* * * * *

UNITED STATES PATENT AND TRADEMARK OFFICE
CERTIFICATE OF CORRECTION

| | | |
|---|---|---|
| PATENT NO. | : 8,631,451 B2 | Page 1 of 1 |
| APPLICATION NO. | : 11/247739 | |
| DATED | : January 14, 2014 | |
| INVENTOR(S) | : James D. Bennett et al. | |

It is certified that error appears in the above-identified patent and that said Letters Patent is hereby corrected as shown below:

In the Claims

Col. 22, line 30, in claim 25: after "least one" insert --of--

Signed and Sealed this
Thirtieth Day of September, 2014

Michelle K. Lee
*Deputy Director of the United States Patent and Trademark Office*